United States Patent
Bortnikov et al.

(10) Patent No.: US 11,385,954 B2
(45) Date of Patent: Jul. 12, 2022

(54) GRAPHICAL MANAGEMENT OF BIG DATA PIPELINES

(71) Applicant: YAHOO ASSETS LLC, Dulles, VA (US)

(72) Inventors: Edward Bortnikov, Haifa (IL); Dmitry Basin, Petah Tikva (IL); Eran Meir, Alon HaGalil (IL)

(73) Assignee: YAHOO ASSETS LLC, Dulles (VA)

( * ) Notice: Subject to any disclaimer, the term of this patent is extended or adjusted under 35 U.S.C. 154(b) by 12 days.

(21) Appl. No.: 16/259,075

(22) Filed: Jan. 28, 2019

(65) Prior Publication Data
US 2020/0241946 A1    Jul. 30, 2020

(51) Int. Cl.
| | | |
|---|---|---|
| *G06F 11/00* | (2006.01) | |
| *G06F 11/07* | (2006.01) | |
| *G06F 9/48* | (2006.01) | |
| *G06F 11/32* | (2006.01) | |

(52) U.S. Cl.
CPC ............ *G06F 11/079* (2013.01); *G06F 9/485* (2013.01); *G06F 9/4881* (2013.01); *G06F 11/0709* (2013.01); *G06F 11/327* (2013.01); *G06F 2209/481* (2013.01)

(58) Field of Classification Search
CPC .............................. G06F 9/485; G06F 9/4881
See application file for complete search history.

(56) References Cited

U.S. PATENT DOCUMENTS

| | | | | |
|---|---|---|---|---|
| 6,233,719 | B1* | 5/2001 | Hardikar | G06Q 10/06 700/110 |
| 10,615,984 | B1* | 4/2020 | Wang | H04L 63/06 |
| 2008/0141112 | A1* | 6/2008 | Aoki | G06F 40/14 715/234 |
| 2008/0189638 | A1* | 8/2008 | Mody | G05B 19/0426 715/771 |
| 2016/0292443 | A1* | 10/2016 | von Muhlen | G06F 21/6218 |

* cited by examiner

*Primary Examiner* — Katherine Lin
(74) *Attorney, Agent, or Firm* — James J. DeCarlo; Greenberg Traurig, LLP (57) ABSTRACT

Technologies for enhancing work scheduling of a big data framework. The technologies can include generating, in a database, configurable namespaces to be used by a work scheduling enhancement application to group together tasks of one or more big data clusters. The namespaces can be hierarchical. The technologies can also include linking in the database, by the application, related tasks with respective namespaces to categorize and group together the related tasks. The technologies can also include configuring, by the application, a display scheme for displaying error handling and root cause analysis of tasks of the one or more big data clusters. The technologies can also include generating or rendering, by the application, a GUI having a navigable hierarchal view for displaying the namespaces. The generation or rendering of the GUI can be based partially on the display scheme.

14 Claims, 6 Drawing Sheets

| Namespace I | Namespace IA | Task I | Timestamp 1 | Error handling and root cause analysis | ← 400 |
| --- | --- | --- | --- | --- | --- |
| | | Task I | Timestamp 2 | ... | |
| | | Task I | Timestamp 3 | ... | |
| | | Task I | Timestamp 4 | ... | |
| | | Task I | Timestamp 5 | ... | |
| | | Task II | Timestamp 1 | ... | |
| | | Task II | Timestamp 2 | ... | |
| | | Task II | Timestamp 3 | ... | |
| | | Task III | Timestamp 1 | ... | |
| | | Task III | Timestamp 2 | ... | |
| | | Task III | Timestamp 3 | ... | |
| | | Task IV | Timestamp 1 | ... | |
| | | Task IV | Timestamp 2 | ... | |
| | | Task IV | Timestamp 3 | ... | |
| | | Task V | Timestamp 1 | ... | |
| | | | Timestamp 2 | ... | |
| | | | Timestamp 3 | ... | |
| | | | Timestamp 4 | ... | |
| | Namespace IB | Task I | Timestamp 1 | ... | |
| | | Task I | Timestamp 2 | ... | |
| | | Task I | Timestamp 3 | ... | |
| | | Task II | Timestamp 1 | ... | |
| | | Task II | Timestamp 2 | ... | |
| | | Task II | Timestamp 3 | ... | |
| | Namespace IC | Task I | Timestamp 1 | ... | |
| | | | Timestamp 2 | ... | |
| | | | Timestamp 3 | ... | |
| | | | Timestamp 4 | ... | |
| Namespace II | | | | | |
| Namespace III | | | | | |

| |
| --- |
| collapse |
| start |
| suspend |
| resume |
| stop |

GRAPHICAL MANAGEMENT OF BIG DATA PIPELINES

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates to graphical management of big data pipelines and clusters, such as graphical management of big data pipelines and clusters that can improve frameworks for big data workflow management.

BACKGROUND

Entity production data processing pipelines for big data are notoriously complex. Such systems of pipelines span many batch jobs that process multiple data feeds with complex coordination patterns. Platforms like APACHE OOZIE, APACHE AIRFLOW, and AMAZON SIMPLE WORKFLOW SERVICE are used to manage these systems, providing: (1) workflow description languages, (2) scheduling mechanisms, and (3) management consoles. However, the platforms have the following drawbacks, for example: (a) it is tough to capture the context of a particular project, (b) it is hard to track projects across big data clusters, (c) it is problematic to get historic perspective of recurring jobs, (d) it is challenging to perform root cause analysis, and (e) it is difficult to enforce project specific service level agreements (SLAs).

The known platforms also lack adequate visualization tools that ease monitoring of health of specific big data projects. The platforms can provide global dashboards with GUIs for navigating big data pipelines, but such GUIs are hard to tailor to specific recurring sets of jobs.

Known alternatives of the platforms do not provide adequate grouping of related jobs into namespaces, zooming in/out the namespace scope to adjust focus in monitoring big data pipeline health, graphical schemes to highlight the status of jobs and job bundles, and customization of behavior of specific nodes within a namespace. Thus, technical problems persist in the art of big data management platforms that prevent easy workflow management.

SUMMARY

Described herein are improved systems and methods for graphical management of big data pipelines and clusters, which can overcome at least the technical problems mentioned in the background section above, such as difficulties associated with platforms like APACHE OOZIE, APACHE AIRFLOW, and AMAZON SIMPLE WORKFLOW SERVICE. Disclosed herein are example systems and methods that solve such problems through a pipeline-centric graphical user interface (GUI), based on the following principles: (1) namespaces for scoping related jobs, (2) hierarchical organization of space, (3) navigable tree views for flexible focus span, (4) customizable node behavior, and (5) organized error handling and root cause analysis according to the navigable tree views and the hierarchical organization of space.

In embodiments of the technologies disclosed herein, the aforesaid example problems are solved by isolation of production engineer attention through namespaces. Also, problems are solved through easy tracking of the overall status of namespaces through color schemes or other types of visual schemes. The GUI part of the solution can also provide for adaptive selection of detail level (e.g., high level view selection for healthy jobs, and detailed view selection for failed jobs). A tree view of namespace jobs in the GUI can include zoom in/out capabilities through expandable and collapsible cells and rows. Also, the nodes of trees in the GUI can have customizable behavior. For example, the nodes can be configurable to behave according to a service level agreement (SLA) and/or parameterized jobs.

The GUI can provide an all-in-one experience such that the restarting, stopping (i.e., killing), resuming, and suspension of jobs (i.e., tasks) can be selected directly in the GUI (such as within a navigable tree). The GUI technologies disclosed herein can also include multi-tenant support and software as a service (SaaS) support as well as strong authorization mechanisms coupled with simple sharing of context. And, the GUI can be configured to provide monitoring for multiple big data clusters, workflow management systems, and users in one view (such as monitoring of multiple clouds of big data management and processing servers in one view).

Also, embodiments provide an engineer productivity improvement tool through simplified management of complex big data workflows and pipelines. The tool can support different advance functionality in a simplified navigable and hierarchical GUI (e.g., project health analytics and recommendations can be provided in an easy to use and navigate GUI).

In summary, examples of the systems and methods disclosed herein for graphical management of big data pipelines and clusters provide specific technical solutions to at least overcome the technical problems mentioned in the background section and other parts of the application as well as other technical problems not described herein but recognized by those skilled in the art.

In accordance with one or more embodiments, this disclosure provides computerized methods for graphical management of big data pipelines and clusters, as well as a non-transitory computer-readable storage medium for carrying out technical steps of the computerized methods. The non-transitory computer-readable storage medium has tangibly stored thereon, or tangibly encoded thereon, computer readable instructions that when executed by one or more devices (e.g., one or more servers) cause at least one processor to perform a method for a novel and improved GUI for management of big data pipelines and clusters.

In accordance with one or more embodiments, a system is provided that includes one or more computing devices configured to provide functionality in accordance with one or more embodiments of a novel and improved way of graphical management of big data pipelines and clusters.

In accordance with one or more embodiments, functionality is embodied in steps of a method performed by at least one computing device. In accordance with one or more embodiments, program code (or program logic) executed by processor(s) of a computing device to implement functionality in accordance with one or more embodiments described herein is embodied in, by and/or on a non-transitory computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DESCRIPTION OF EMBODIMENTS

The present disclosure will now be described more fully hereinafter with reference to the accompanying drawings, which form a part hereof, and which show, by way of illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium can include computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid-state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers can vary widely in configuration or capabilities, but generally a server can include one or more central processing units and memory. A server can also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that can couple devices so that communications can be exchanged, such as between a server and a client device or other types of devices, including between wireless devices coupled via a wireless network, for example. A network can also include mass storage, such as network attached storage (NAS), a storage area network (SAN), or other forms of computer or machine-readable media, for example. A network can include the Internet, one or more local area networks (LANs), one or more wide area networks (WANs), wire-line type connections, wireless type connections, cellular or any combination thereof. Likewise, sub-networks, which can employ differing architectures or can be compliant or compatible with differing protocols, can interoperate within a larger network. Various types of devices can, for example, be made available to provide an interoperable capability for differing architectures or protocols. As one illustrative example, a router can provide a link between otherwise separate and independent LANs.

A communication link or channel can include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as can be known to those skilled in the art. Furthermore, a computing device or other related electronic devices can be remotely coupled to a network, such as via a wired or wireless line or link, for example.

A computing device can be capable of sending or receiving signals, such as via a wired or wireless network, or can be capable of processing or storing signals, such as in memory as physical memory states, and can, therefore, operate as a server. Thus, devices capable of operating as a server can include, as examples, dedicated rack mounted servers, desktop computers, laptop computers, set top boxes, integrated devices combining various features, such as two or more features of the foregoing devices, or the like. Servers can vary widely in configuration or capabilities, but generally a server can include one or more central processing units and memory. A server can also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client device can include a computing device capable of sending or receiving signals, such as via a wired or a wireless network. A client device can, for example, include a desktop computer or a portable device, such as a cellular telephone, a smart phone, a display pager, a radio frequency (RF) device, an infrared (IR) device, an NFC device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device can vary in terms of capabilities or features. Claimed subject matter is intended to cover a wide range of potential variations. For example, a simple smart phone, phablet or tablet can include a numeric keypad or a display of limited functionality, such as a monochrome liquid crystal display (LCD) for displaying text. In contrast, however, as another example, a web-enabled client device can include a high-resolution screen, one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device can include or can execute a variety of operating systems, including a personal computer operating system, such as a Windows, iOS or Linux, or a mobile operating system, such as iOS, Android, or Windows Mobile, or the like.

A client device can include or can execute a variety of possible applications, such as a client software application enabling communication with other devices, such as communicating one or more messages, such as via email, for example Yahoo! ® Mail, short message service (SMS), or multimedia message service (MMS), for example Yahoo! Messenger®, including via a network, such as a social network, including, for example, Tumblr®, Facebook®, LinkedIn®, Twitter®, Flickr®, or Google+®, Instagram™, to provide only a few possible examples. A client device can also include or execute an application to communicate content, such as, for example, textual content, multimedia content, or the like. A client device can also include or execute an application to perform a variety of possible tasks, such as browsing, searching, playing, streaming or displaying various forms of content, including locally stored or uploaded images and/or video, or games (such as fantasy sports leagues). The foregoing is provided to illustrate that claimed subject matter is intended to include a wide range of possible features or capabilities.

Figure 1:
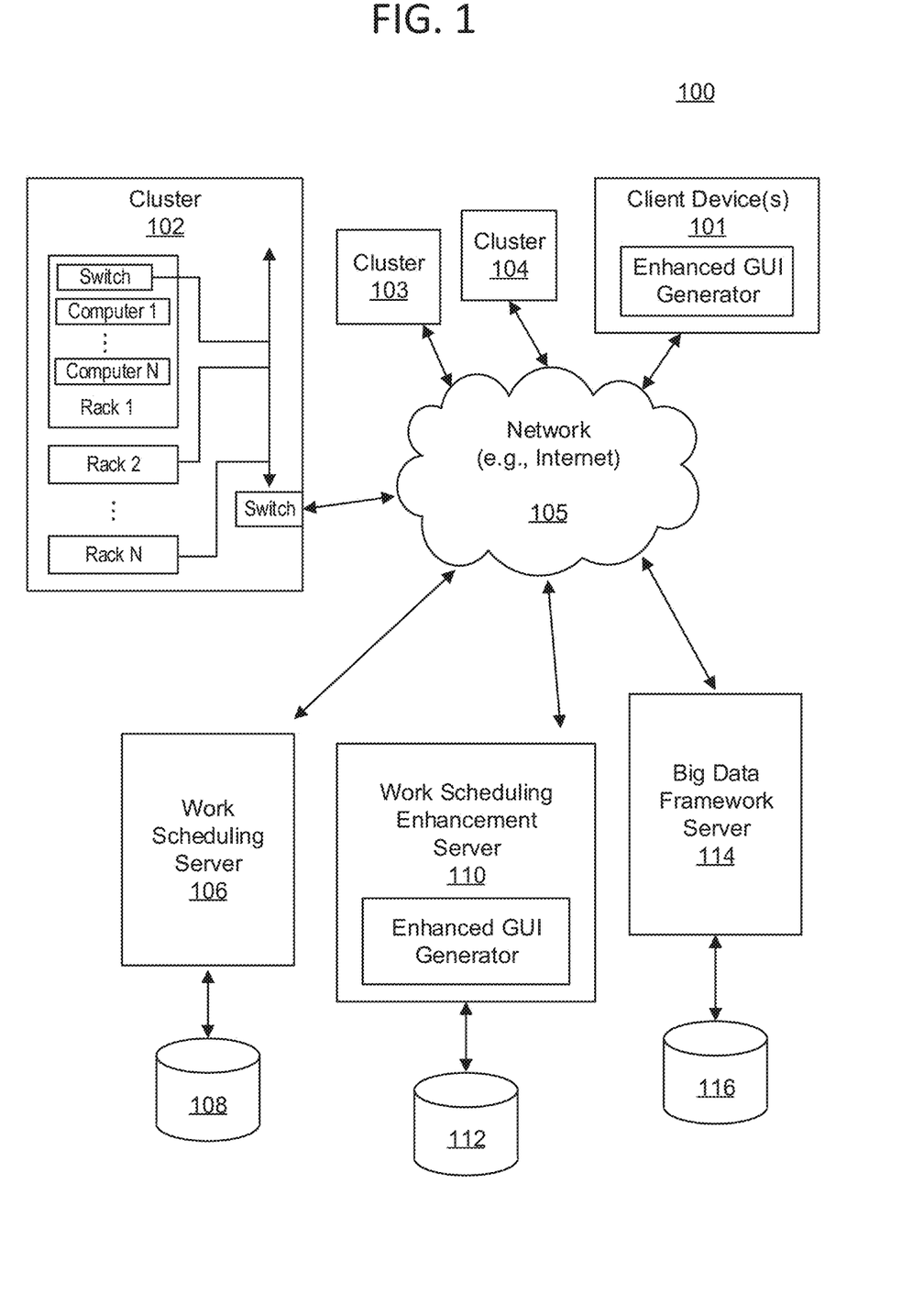
FIG. 1 is a schematic diagram illustrating an example of a network (which includes elements that can implement graphical management of big data pipelines and clusters) within which systems and methods disclosed herein can be implemented according to some embodiments of the present disclosure.

Certain embodiments will now be described in greater detail with reference to the FIGS. 1-6. In general, with reference to FIG. 1, a system 100 in accordance with an embodiment of the present disclosure is shown. FIG. 1 shows components of a general environment in which the systems and methods discussed herein can be practiced. Not all the components can be required to practice the disclosure, and variations in the arrangement and type of the components can be made without departing from the spirit or scope of the disclosure. As shown, system 100 of FIG. 1 includes local area networks ("LANs")/wide area networks ("WANs")–network 105, one or more client devices 101, and big data clusters 102-104. Applications used by the client device(s) 101 and the clusters 102-104 can be served by the servers illustrated in FIG. 1, and such applications can be enhanced by graphical user interface (GUI) generator for generating and controlling a GUI for big data work scheduling enhancement. The structure of the enhanced GUI generator is further described with reference to enhanced GUI generator 244 depicted in FIG. 2.

As shown, system 100 of FIG. 1 also includes work scheduling server 106 communicatively coupled to database 108 used by the work scheduling server, and work scheduling enhancement server 110 that can persistently store the enhanced GUI generator described herein and can provide the enhanced GUI generator to other computing devices for being stored in memory of those devices or persistently stored in those devices (such as client device(s) 101). Also, as shown, system 100 of FIG. 1 includes database 112 communicatively coupled to work scheduling enhancement server 110 and used by the enhanced GUI generator and the server 110, and a big data framework server 114 communicatively coupled to database 116 use by the big data framework server. The databases described herein can be used by the servers to select, store and organize data used as input for the processes described herein. For example, information described herein (e.g., information on namespaces and associated big data tasks) can be from one or more of the databases described herein. The clusters described herein can select and use the data stored and organized in the databases as input for data processing and management tasks described herein.

It is to be understood that the processes described herein can be executed by one or more of the clusters, client devices, and servers disclosed herein. Specifically, for example, each of the client device(s) 101 and servers 106, 110, and 114 can include a device that includes a configuration to perform at least some of the operations of process 300 depicted in FIG. 3 and to implement and/or support architecture 600 depicted in FIG. 6. Also, for example, each of the clusters 102-104 can include multiple devices that include configurations to perform the big data tasks referenced in process 300 and architecture 600. Example embodiments of client device(s) 101, clusters 102-104 and servers 106, 110, and 114 as well as the network 105 are described in more detail below.

Generally, client device(s) 101 can include virtually any computing device capable of receiving and sending a message over a network, such as network 105—which could include a wireless network—, or the like. Client device(s) 101 can also be mobile devices that are configured to be portable and held in a hand or two hands. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, smart watch, tablet computers, phablets, integrated devices combining one or more of the preceding devices, and the like. As such, mobile devices typically range widely in terms of capabilities and features. For example, a cell phone can have a numeric keypad and a few lines of monochrome LCD display on which only text can be displayed. In another example, a web-enabled mobile device can have a touch sensitive screen, a stylus, and an HD display in which both text and graphics can be displayed.

A web-enabled client device can include a browser application that is configured to receive and to send web pages, web-based messages, and the like. The browser application can be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Client device(s) 101, clusters 102-104, and servers 106, 110, and 114 can each include at least one client application (such as part of the enhanced GUI generator) that is configured to receive content or data from another computing device. The client application can include a capability to provide and receive textual content, graphical content, audio content, authentication and keying information, and the like. The client application can further provide information that identifies itself, including a type, capability, name, and the like. In one embodiment, client device(s) 101, clusters 102-104 (and each computer in the clusters), and servers 106, 110, and 114 can each uniquely identify themselves through any of a variety of mechanisms. Client devices can be identifiable via a phone number, Mobile Identification Number (MIN), an electronic serial number (ESN), or another type of device identifier. Servers, clusters, and computers within clusters can be identifiable via an electronic serial number (ESN) or another type of device identifier.

In general, client device(s) 101, clusters 102-104 (and each computer within the clusters), and servers 106, 110, and 114 can be capable of sending or receiving signals, such as via a wired or wireless network, or can be capable of processing or storing signals, such as in memory as physical memory states.

Network 105 is configured to couple client device(s) 101, clusters 102-104 (and each computer within the clusters), and servers 106, 110, and 114, or the like, with other computing devices. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another, and/or other computing devices.

Within the communications networks utilized or understood to be applicable to the present disclosure, such networks will employ various protocols that are used for communication over the network. Signal packets communicated via a network, such as a network of participating digital communication networks, can be compatible with or compliant with one or more protocols. Signaling formats or protocols employed can include, for example, TCP/IP, UDP, QUIC (Quick UDP Internet Connection), DECnet, NetBEUI, IPX, APPLETALK™, or the like. Versions of the Internet Protocol (IP) can include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets can be communicated between nodes of a network, such as, for example, to one or more sites employing a local network address. A signal packet can, for example, be communicated over the Internet from a user site via an access node coupled to the Internet. Likewise, a signal packet can be forwarded via network nodes to a target site coupled to the network via a network access node, for example. A signal packet communicated via the Internet can, for example, be routed via a path of switches, gateways, servers, etc. that can route the signal packet in accordance with a target address and availability of a network path to the target address.

In some embodiments, the network 105 can include content distribution network(s) and/or application distribution network(s). A content distribution network (CDN) or an application distribution network (ADN) generally refers to a delivery system that includes a collection of computers or computing devices linked by a network or networks. A CDN or ADN can employ software, systems, protocols or techniques to facilitate various services, such as storage, caching, communication of content, or streaming media or applications included, associated with, or used by the enhanced GUI generator.

Generally, the servers 106, 110, and 114 as well as the computers of the clusters 102-104 can include a device that includes a configuration to provide content such as interactive content via a network to another device. Devices that can operate as such server(s) include personal computers desktop computers, multiprocessor systems, microprocessor-based or programmable consumer electronics, network PCs, servers, and the like. The servers 106, 110, and 114, as well as the computers of the clusters 102-104, in addition to the primary services provided by the servers and computers (described in detail below), can further provide a variety of additional services that include, but are not limited to, streaming and/or downloading media services, search services, email services, photo services, web services, social networking services, news services, third-party services, audio services, video services, instant messaging (IM) services, SMS services, MMS services, FTP services, voice over IP (VOIP) services, or the like. Such services can be used by a user upon the user being authenticated, verified or identified by the service. Examples of content can include videos, text, audio, images, or the like, which can be processed in the form of physical signals, such as electrical signals, for example, or can be stored in memory, as physical states, for example.

Servers 106, 110, and 114 as well as the computers of the clusters 102-104 can be capable of sending or receiving signals, such as via a wired or wireless network, or can be capable of processing or storing signals, such as in memory as physical memory states. Devices capable of operating as a server can include, as examples, dedicated rack-mounted servers or computers (such as the computers of clusters 102-104), desktop computers, laptop computers, set top boxes, integrated devices combining various features, such as two or more features of the foregoing devices, or the like. Servers as well computers of clusters can vary widely in configuration or capabilities, but generally, a server can include one or more central processing units and memory. A server or a computer of a cluster can also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In some embodiments, users are able to access services provided by servers 106, 110, and 114 as well as the computers of the clusters 102-104. The servers 106, 110, and 114 as well as the computers of the clusters 102-104 can store various types of applications and application related information including application data and user profile information (e.g., identifying and behavioral information associated with a user). It should also be understood that servers 106, 110, and 114 as well as the computers of the clusters 102-104 can also store various types of data related to content and services provided by an associated database.

Embodiments exist where the network 105 is also coupled with/connected to a Trusted Search Server (TSS) which can be utilized to render content/data/information in accordance with the embodiments discussed herein. Embodiments exist where the TSS functionality can be embodied within servers 106, 110, and 114 as well as the computers of the clusters 102-104 and network 105.

Specifically, each cluster of clusters 102-104 include a switch for controlling communications sent to and received from other clusters and devices through the network 105. The switch can also control the selection of a rack of computers in a cluster to receive a communication, as well as it can control the sending to a device internal or external to the cluster from a rack of computers in the cluster. Also, each rack in each of the clusters 102-104 can include a respective switch as well, which can control communications sent and received by computers within the rack. As shown by cluster 102, for example, each one of the clusters described herein can include a communications bus that connects multiple computers and switches of the cluster, and the multiple computers of the cluster can be organized into racks. For example, as shown, cluster 102 includes at least three racks, and each of the racks include multiple computers and at least one switch which controls communications sent from and received by the computers in the rack. Also, for example, the cluster 102 includes a master switch which controls communications sent from and received by the cluster.

Big data framework server 114 provides services of a big data framework, such as services provide through APACHE HADOOP. In some embodiments, big data framework server 114 can implement APACHE HADOOP. Services of a big data framework can include services that support big data processes and management in which big data refers to data sets that are too large or complex for traditional data-processing application software. Big data processes and management can include the use of predictive analytics, user behavior analytics, or certain other advanced data analytics methods that extract value from very large sets of data. Such analytics can provide new and valuable correlations to identify social, scientific, and business trends and remedy and prevent illness and disasters, to say the least. Big data processes and management through services of a big data framework are essential since data sets have grown enormously from the increase in information gather over the Internet and through various types of computing devices (e.g., Internet of Things devices).

The services provided by framework server 114 can include relational database management systems, various statistics programs and software packages used to visualize data in a big data context. The services can support and/or include parallel software running on tens, hundreds, or even thousands of servers. One service that can be critical to big data processing and management is a service for scheduling jobs or tasks performed by clusters of computers of a big data processing and management network. An example of job scheduling services can be provided through systems such as APACHE OOZIE which is a server-based workflow scheduling system to manage APACHE HADOOP tasks.

Work scheduling server 106 provides services for scheduling jobs or tasks performed by the clusters as well as managed and controlled through the big data framework server 114. For example, the work scheduling server 106 can implement APACHE OOZIE. Workflow scheduling managed by APACHE OOZIE or other platforms for big data work scheduling can be used to define a sets of control flow and action nodes in a graph such as a directed acyclic graph. Control flow nodes can identify the beginning and the end of a workflow as well as failing parts and mechanisms to control the workflow execution path (such as decision, fork, and join nodes). The control flow nodes can include action nodes which can trigger the execution of computation or processing tasks, such as the big data tasks described herein. APACHE OOZIE and other platforms for big data work scheduling can provide support for different types of actions and services involved with a big data framework including various HADOOP functions (e.g., MapReduce and distributed file system operations), APACHE PIG and other types of platforms for analyzing large datasets, SSH, and email—just to name a few.

Scheduled workflows can be parameterized, by the work scheduling server 106, using variables within a workflow definition. When submitting a workflow job, values for the parameters must be provided to work scheduling server 106 or the work scheduling enhancement server 110 via a GUI such as the GUI generated by the enhanced GUI generator. If properly parameterized (using different output directories), several workflow jobs or tasks can run concurrently on clusters such as clusters 102-104. Specifically, work scheduling enhancement server 110 can provide the services and processes through control of the graphically enhanced GUI generated by the enhanced GUI generator. For example, the work scheduling enhancement server 110 can perform one or more processes disclosed in the description of FIG. 3 and/or can distribute instructions to client device(s) 101 so that the client device(s) can perform one or more of the processes disclosed in the description of FIG. 3.

Moreover, although FIG. 1 illustrates servers 106, 110, and 114 as single computing devices, respectively, the disclosure is not so limited. For example, one or more functions of servers 106, 110, and 114 can be distributed across one or more distinct computing devices. Moreover, in one embodiment, servers 106, 110, and 114 can be integrated into a single computing device, without departing from the scope of the present disclosure.

Figure 2:
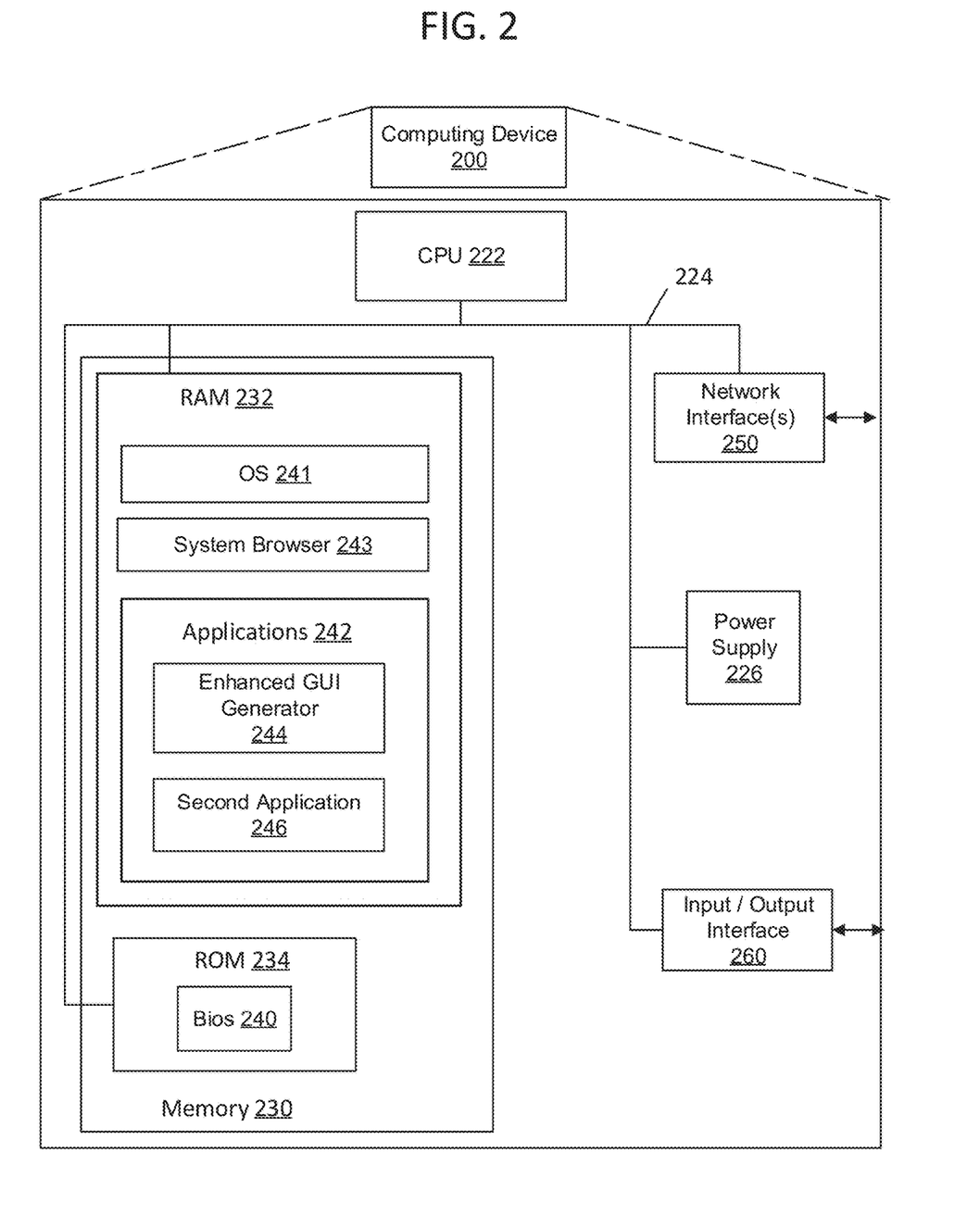
FIG. 2 is a schematic diagram illustrating an example of a computing device, in accordance with some embodiments of the present disclosure.

FIG. 2 is a schematic diagram illustrating a computing device 200 showing an example embodiment of a computing device that can be used within the present disclosure. The computing device 200 can include many more or less components than those shown in FIG. 2. However, the components shown are sufficient to disclose an illustrative embodiment for implementing some aspects the present disclosure. The computing device can represent, for example, any one or more of the servers or client devices discussed above in relation to FIG. 1.

As shown in the figure, computing device 200 includes a processing unit (CPU) 222 in communication with a mass memory 230 via a bus 224. Computing device 200 also includes a power supply 226, one or more network interfaces 250, and an input/output interface 260 (which can include an audio interface, a display, a keypad, an illuminator, a global positioning systems (GPS) receiver, sensors, and an input/output interface to such devices).

Power supply 226 provides power to computing device 200. A rechargeable or non-rechargeable battery can be used to provide power. The power can also be provided by an external power source, such as an AC adapter or a powered docking cradle that supplements and/or recharges a battery. Computing device 200 can optionally communicate with a base station (not shown), or directly with another computing device. Network interface 250 includes circuitry for coupling computing device 200 to one or more networks, and is constructed for use with one or more communication protocols and technologies as discussed above. Network interface 250 is sometimes known as a transceiver, transceiving device, or network interface card (NIC). The input/output interface 260 can be used for communicating with external devices. Input/output interface 260 can utilize one or more communication technologies, such as USB, infrared, Bluetooth™, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of computing device 200. The mass memory also stores an operating system 241 in RAM 232 for controlling the operation of computing device 200. It will be appreciated that this component can include a general-purpose operating system such as a version of UNIX, or LINUX™, or a specialized client communication operating system such as Windows Client™, or the Symbian® operating system. The operating system can include, or interface with a Java virtual machine module that enables control of hardware components and/or operating system operations via Java application programs.

Figure 3:
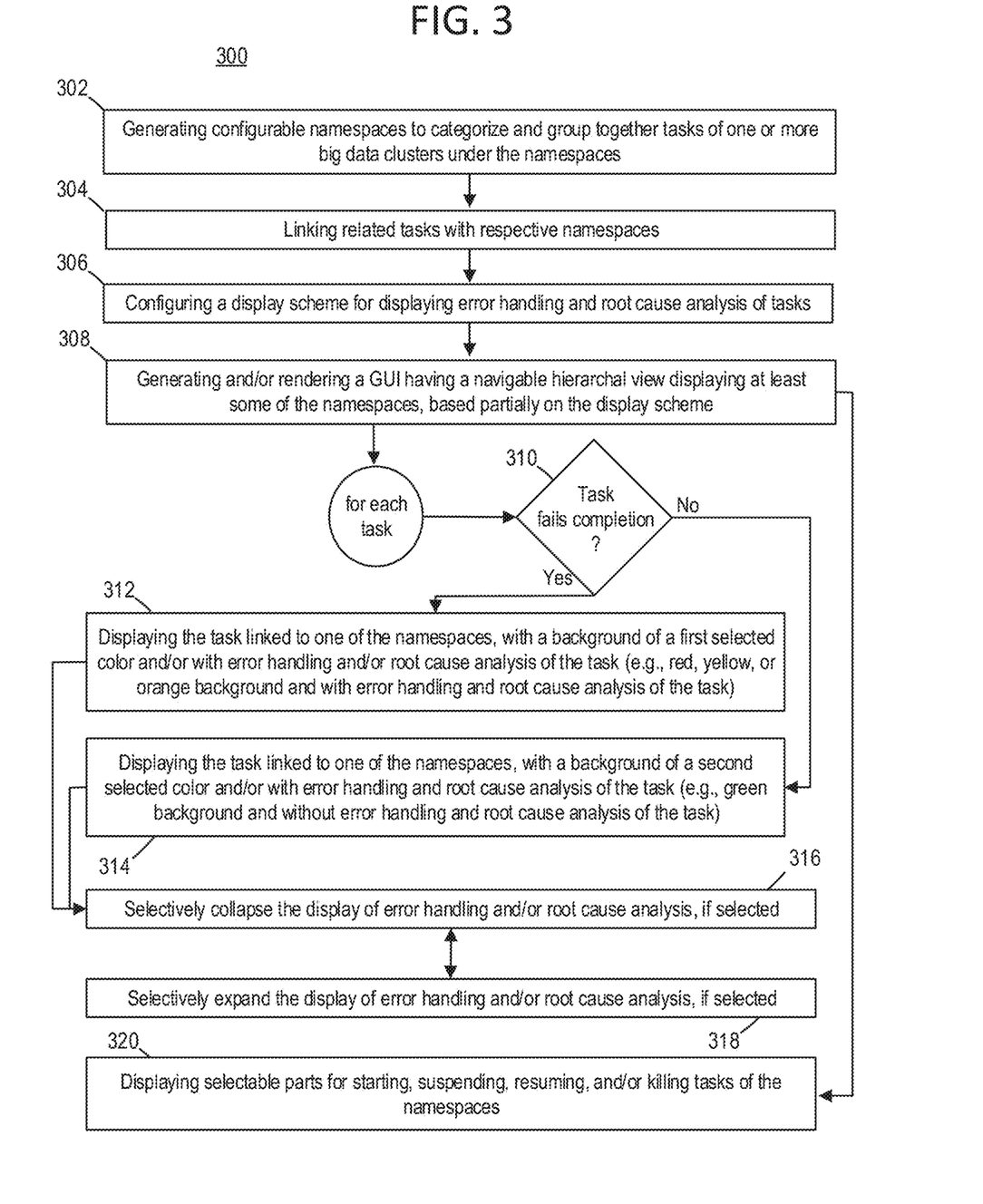
FIG. 3 is a flowchart illustrating an example method, in accordance with some embodiments of the present disclosure.
Figure 4A:
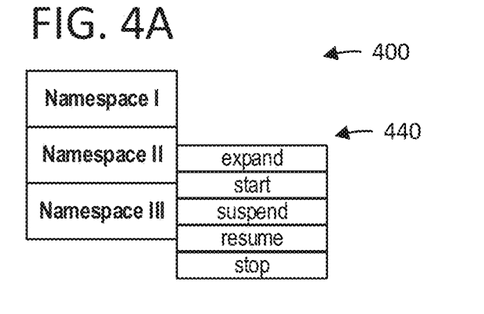
FIGS. 4A, 4B, 4C, and 5 illustrate example hierarchical and navigable parts of a GUI, in accordance with some embodiments of the present disclosure.
Figure 4B:
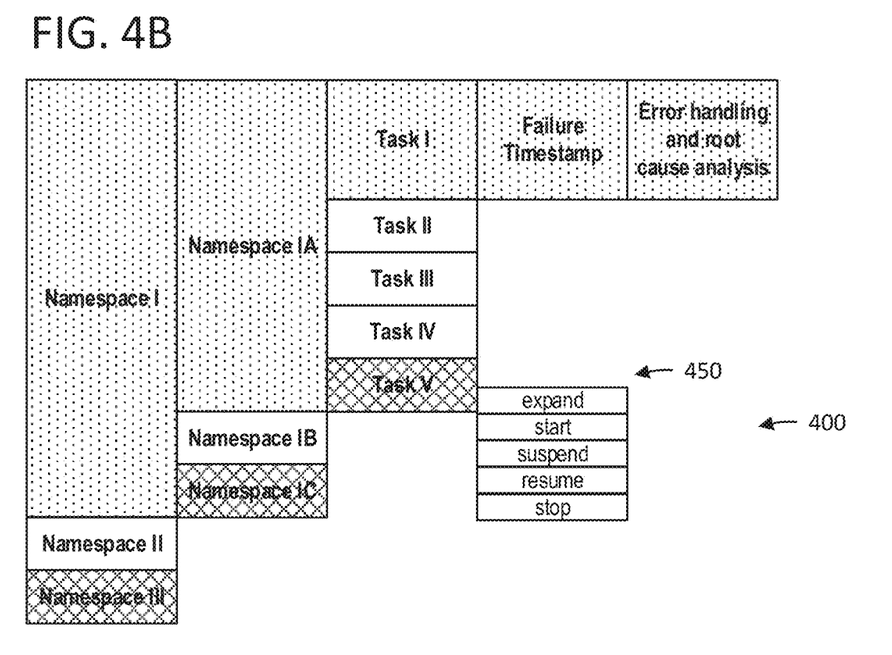
Figure 4C:
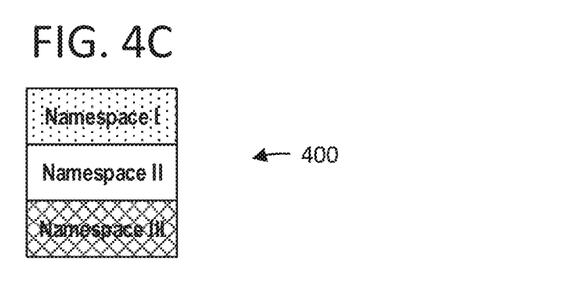
Figure 5:
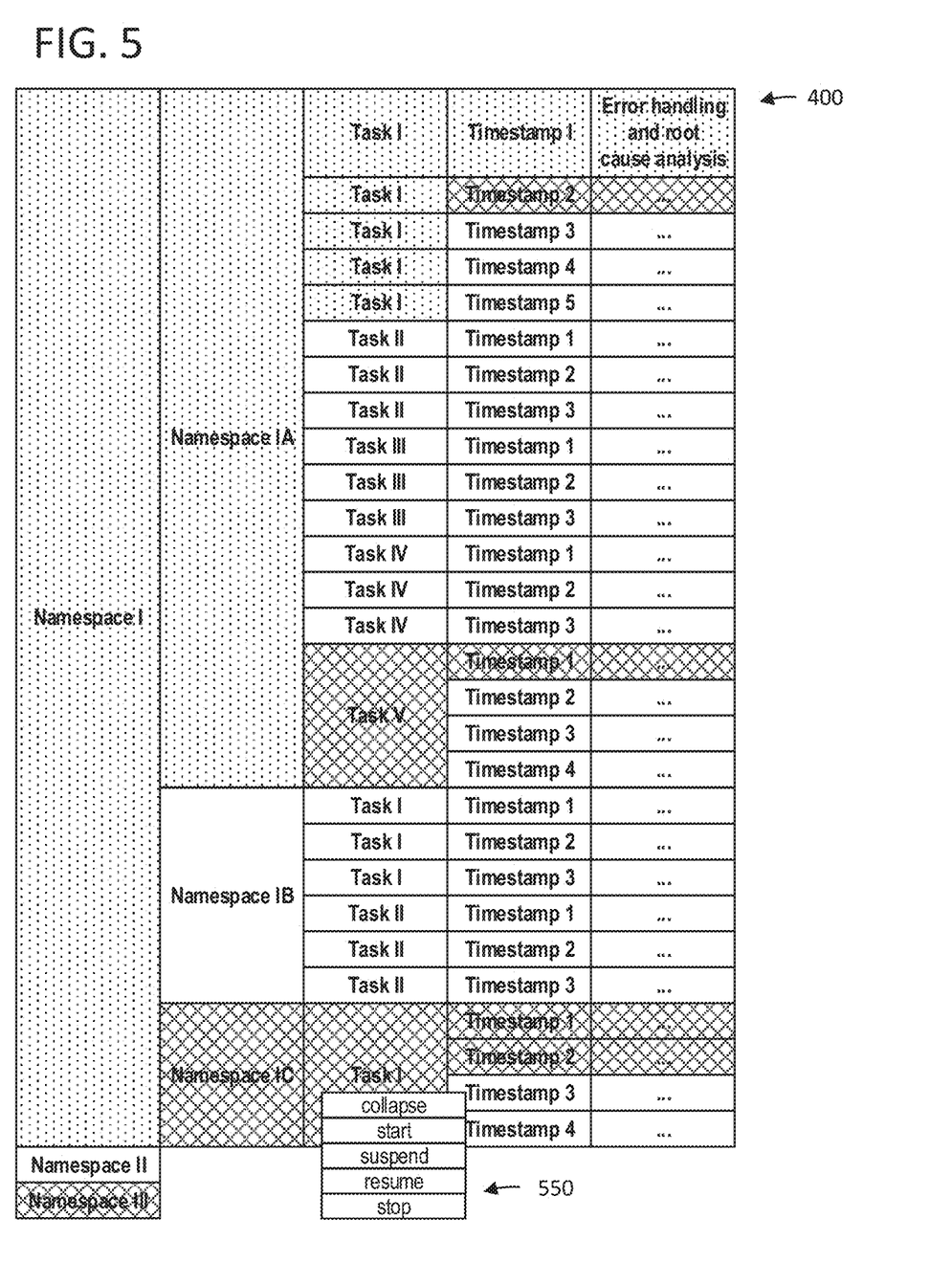

The mass memory also stores a system browser in RAM 232 for controlling operations of a system browser 243 and applications 242, such as enhanced GUI generator 244 which perform all or many of the operations described herein in relation to FIGS. 3-5. The applications 242 can also include second application 246 that can perform some of the operations described herein in relation to FIGS. 3-5. In some embodiments, second application 246 can perform all or some of the steps of processes depicted in FIGS. 3-5 in conjunction with enhanced GUI generator 244.

The enhanced GUI generator 244 and/or the second application 242 can include, be a part of, or be a non-transitory computer-readable storage medium tangibly encoded with computer-executable instructions, that when executed by processing unit 222 of computing device 200, performs a method such as steps of process 300.

Memory 230 further includes one or more data stores, which can be utilized by computing device 200 to store, among other things, the system browser 243, the applications 242 and/or other data. For example, data stores can be employed to store information that describes various capabilities of computing device 200. The information can then be provided to another device based on any of a variety of events, including being sent as part of a header during a communication, sent upon request, or the like. At least a portion of the capability information can also be stored on a disk drive or other storage medium (not shown) within computing device 200.

Applications 242 can include computer executable instructions which, when executed by computing device 200 or any of the other servers described herein, transmit, receive, and/or otherwise process text, audio, video, images, and enable telecommunication with other servers and/or another user of another client device. Examples of application programs or "apps" in some embodiments include browsers, calendars, contact managers, task managers, transcoders, photo management, database programs, word processing programs, security applications, spreadsheet programs, games, search programs, and so forth.

In some embodiments, the computing device 200 can include a processor and a non-transitory computer-readable storage medium for tangibly storing thereon program logic for execution by the processor, the program logic having executable logic for performing the steps of process 300. For example, it can have executable logic for generating, in a database, a first configurable namespace to be used by a work scheduling enhancement application to group together a first plurality of tasks of a big data cluster. It can have executable logic for generating, in the database, a second configurable namespace to be used by the application to group together a second plurality of tasks of the big data cluster. The second configurable namespace can be generated as a child namespace of the first configurable namespace such that the first configurable namespace is a parent namespace of the second configurable namespace. It can have executable logic for generating, in the database, a third configurable namespace to be used by the application to group together a third plurality of tasks of the big data cluster. The third configurable namespace can be generated as a child namespace of the first configurable namespace such that the first configurable namespace is a parent namespace of the third configurable namespace and the second configurable namespace is a sibling namespace of the third configurable namespace.

Also, for example, it can have executable logic for linking in the database, by the application, the first plurality of tasks with the first configurable namespace to group together the first plurality of tasks under the first configurable namespace. It can have executable logic for linking in the database, by the application, the second plurality of tasks with the second configurable namespace to group together the second plurality of tasks under the second configurable namespace. It can have executable logic for linking in the database, by the application, the third plurality of tasks with the third configurable namespace to group together the third plurality of tasks under the third configurable namespace.

It can have executable logic for configuring, by the application, a display scheme for displaying error handling and root cause analysis of tasks of the big data cluster. The display scheme can include respective first, second, and third sub-display schemes for the first, second, and third configurable namespaces. And, the program logic can further have executable logic for configuring, by the application, each of the sub-display schemes for displaying error handling and root cause analysis of tasks separately and differently. Further, the configuring of the display scheme can include configuring a color scheme for displaying error handling and root cause analysis of tasks. In such examples, the program logic can further include executable logic for displaying a task linked to one of the configurable namespaces with a background of a first selected color and with error handling and root cause analysis of the task, based on the color scheme, when the task fails to be completed. Also, in such examples, the program logic can further include executable logic for displaying the task with a background of a second selected color and without error handling and root cause analysis, based on the color scheme, when the task is completed.

It can also have executable logic for generating, by the application, a GUI having a navigable hierarchal view displaying the first configurable namespace as a parent namespace of the second and third configurable namespaces. The generation of the GUI can be based partially on the display scheme. It can also have executable logic for displaying a task linked to one of the configurable namespaces with error handling and root cause analysis of the task, when the task fails to be completed. It can also have executable logic for selectively collapsing the display of error handling and root cause analysis such that the navigable hierarchal view is only displaying the task failing to be completed without the display of error handling and root cause analysis. Also, in can have executable logic for selectively expanding the collapsed display to display the error handling and root cause analysis. Also, according to executable logic, the GUI can display, in the navigable hierarchal view, selectable parts for performing a function such as starting, suspending, resuming, or stopping tasks of the namespaces, or any combination thereof.

Having described components of the architecture example employed within the disclosed systems and methods, the components' operations with respect to the disclosed systems and methods will now be described below with reference to FIGS. 3-5.

In FIG. 3, process 300 details steps performed by one or more computing devices (such as one or more of the computing devices described herein), in accordance with some embodiments of the present disclosure. Specifically, the steps of process 300 can be performed by an enhanced GUI generator running on one or more computing devices (such as the enhanced GUI generator 244 running on one or more of the client device(s) 101 and work scheduling enhancement server 110). In general, the steps are for enhanced graphical management of big data pipelines and clusters.

Process 300 begins with step 302, which includes an enhanced GUI generator, such as enhanced GUI generator 244, or one or more other parts of one or more computing devices (such as computing device 200 depicted in FIG. 2) generating configurable namespaces (e.g., namespaces I, II, and III depicted in FIGS. 4A, 4B, 4C, and 5 as well as the sub-namespaces IA, IB, and IC depicted in FIGS. 4C and 5) to categorize and group together tasks (e.g., tasks I, II, III, IV, and V of namespace IA depicted in FIGS. 4B and 5) of one or more big data clusters under the namespaces.

In some embodiments, the enhanced GUI generator (or one or more other parts of one or more computing devices) generates, in a database (such database 112), a first configurable namespace to be used by a work scheduling enhancement application to group together a first plurality of tasks of a big data cluster. In such embodiments, the enhanced GUI generator (or one or more other parts of one or more computing devices) can generate, in the database, a second configurable namespace to be used by the application to group together a second plurality of tasks of the big data cluster. The second configurable namespace can be generated as a child namespace of the first configurable namespace such that the first configurable namespace is a parent namespace of the second configurable namespace (e.g., see namespace IA which is a child namespace of namespace I depicted in FIG. 4B). The enhanced GUI generator (or one or more other parts of one or more computing devices) can also generate, in the database, a third configurable namespace (and so on) to be used by the application to group together a third plurality of tasks of the big data cluster. The third configurable namespace can be generated as a child namespace of the first configurable namespace such that the first configurable namespace is a parent namespace of the third configurable namespace and the second configurable namespace is a sibling namespace of the third configurable namespace (e.g., see sibling namespaces IA and IB illustrated in FIG. 4B).

The scope of the first configurable namespace can correspond to the scope of big data management and processing of an entire cluster. In such examples, the first configurable namespace can have at least one sibling configurable namespace having a scope corresponding to the scope of big data management and processing of another entire cluster.

In step 304, the enhanced GUI generator (or one or more other parts of one or more computing devices) links related tasks with respective namespaces (e.g., see tasks I, II, III, IV, and V which are shown linked to namespace IA depicted in FIGS. 4B and 5). In some embodiments, the enhanced GUI generator (or one or more other parts of one or more computing devices) links, in the database, the aforesaid second plurality of tasks with the second configurable namespace to group together the second plurality of tasks under the second configurable namespace. Such an embodiment can also include the enhanced GUI generator (or one or more other parts of one or more computing devices) linking, in the database, the aforesaid third plurality of tasks with the third configurable namespace to group together the third plurality of tasks under the third configurable namespace. Also, such embodiments can include the enhanced GUI generator (or one or more other parts of one or more computing devices) linking, in the database, the aforesaid first plurality of tasks with the first configurable namespace to group together the first plurality of tasks under the first configurable namespace. Alternatively, a root parent namespace, such as shown by namespace I, may not be linked to tasks directly. In such examples, the root parent namespace is linked to tasks through its sub-namespaces that are linked to respective tasks.

In step 306, the enhanced GUI generator (or one or more other parts of one or more computing devices) configures a display scheme for displaying error handling and root cause analysis of tasks. For example, enhanced GUI generator (or one or more other parts of one or more computing devices) can configure a display scheme for displaying error handling and root cause analysis of tasks of the big data cluster.

In step 308, the enhanced GUI generator (or one or more other parts of one or more computing devices) generates and/or renders a GUI having a navigable hierarchal view displaying at least some of the namespaces, based partially on the display scheme (e.g., see the navigable hierarchal view 400 illustrated in different states in FIGS. 4A, 4B, 4C, and 5). For example, the enhanced GUI generator (or one or more other parts of one or more computing devices) generates a GUI having a navigable hierarchal view displaying the first configurable namespace as a parent namespace of the second and third configurable namespaces, and the generation of the GUI can be based partially on the display scheme. In some embodiments, the display scheme can include respective first, second, and third sub-display schemes for the first, second, and third configurable namespaces. In such examples, process 300 can further include configuring, by the enhanced GUI generator (or one or more other parts of one or more computing devices), each of the sub-display schemes for displaying error handling and root cause analysis of tasks separately and differently.

Generally, the enhanced GUI generator (or one or more other parts of one or more computing devices) can display a task linked to one of the configurable namespaces with error handling and root cause analysis of the task, when the task fails to be completed. In some embodiments, the configuring of the display scheme can include configuring a color scheme for displaying error handling and root cause analysis of tasks. For example, configuring of the display scheme can include configuring the color scheme to be a first certain color for displaying error handling and root cause analysis of tasks. Also, the configuring can include configuring the color scheme to be the first certain color for a corresponding namespace and task, where the tasked as failed to be completed. In such examples, the enhanced GUI generator (or one or more other parts of one or more computing devices) can display a task linked to one of the configurable namespaces with a background of a first selected color and with error handling and root cause analysis of the task, based on the color scheme, when the task fails to be completed. Also, the enhanced GUI generator (or one or more other parts of one or more computing devices) can display the task with a background of a second selected color and without error handling and root cause analysis, based on the color scheme, when the task is completed.

In step 310, the enhanced GUI generator (or one or more other parts of one or more computing devices), for each task, determines if the task has failed to be completed.

In step 312, the enhanced GUI generator (or one or more other parts of one or more computing devices), for each task determined as failing to be completed, displays the task as it is linked to one of the namespaces with a background of a first selected color and/or with error handling and/or root cause analysis of the task (e.g., red, yellow, or orange background and with error handling and root cause analysis of the task). For instance, FIG. 4B shows task I of sub-namespace IA of namespace I failing to be completed, in the navigable hierarchal view 400. The view 400 displays the task I as it is linked to the namespaces with a background of a first selected color and with error handling and root cause analysis of the task.

In step 314, the enhanced GUI generator (or one or more other parts of one or more computing devices), for each task determined as not failing to be completed, displays the task as it is linked to one of the namespaces with a background of a second selected color and/or with error handling and root cause analysis of the task (e.g., green background and without error handling and root cause analysis of the task). For instance, FIG. 4B shows task II of sub-namespace IA of namespace I not failing to be completed, in the navigable hierarchal view 400. The view 400 displays the task II as it is linked to the namespaces with a background of a second selected color and without error handling and root cause analysis of the task.

In step 316, the enhanced GUI generator (or one or more other parts of one or more computing devices) selectively collapses the display of error handling and/or root cause analysis, if selected (such as selected by the user in the GUI). For example, in FIG. 4B, namespace I is shown as having task I which has failed to be completed. In FIG. 4C, namespace I is shown as having a tasked failing to be completed, but has been selected to be collapsed so that the display of error handling and root cause analysis is not displayed as well as the sub-namespace IA and task I is not displayed. In some embodiments, the enhanced GUI generator (or one or more other parts of one or more computing devices) can selectively collapse the display of error handling and root cause analysis such that the navigable hierarchal view is only displaying the task failing to be completed without the display of error handling and root cause analysis, and it can also selectively expand the collapsed display to display the error handling and root cause analysis.

In step 318, the enhanced GUI generator (or one or more other parts of one or more computing devices) selectively expands the display of error handling and/or root cause analysis, if selected (such as selected by the user in the GUI). For example, in FIG. 4B, namespace I is shown as having task I which has failed to be completed. In FIG. 4C, namespace I is shown as having a tasked failing to be completed, but has been selected to be collapsed so that the display of error handling and root cause analysis is not displayed as well as the sub-namespace IA and task I is not displayed. Then, returning to FIG. 4B, namespace I is shown as having a tasked failing to be completed and has been selected to be expanded so that the display of error handling and root cause analysis is displayed as well as the sub-namespace IA and task I is displayed.

In step 320, the enhanced GUI generator (or one or more other parts of one or more computing devices) displays selectable parts for starting, suspending, resuming, and/or stopping (i.e., killing) tasks of the namespaces. A user can then select one of the parts so that the framework supporting the task can start, suspend, resume, and/or stop (i.e., kill) the task accordingly. In some embodiments, the GUI displays, in the navigable hierarchal view, selectable parts for performing starting, suspending, resuming, or stopping tasks of the namespaces, or any combination thereof.

For example, see FIG. 4B, where a user has selected the graphical representation of task V to display a dropdown menu 450 with respective selectable parts for starting, suspending, resuming, and stopping task V. Also, shown in the menu 450 is a respective selectable part for expanding the task V to show at least its recent instances of being performed and possibly other information related to the task such as error handling and/or root cause analysis. Also, for example, see FIG. 4A, where a user has selected the graphical representation of namespace II to display a dropdown menu 440 with respective selectable parts for starting, suspending, resuming, and stopping the multiple tasks of namespace II. Also, shown in the menu 440, is a respective selectable part for expanding the namespace II to show at least its related sub-namespaces and/or tasks.

Another example is shown in FIG. 5 where a user has selected the graphical representation of task I of namespace IC of namespace Ito display a dropdown menu 550 with respective selectable parts for starting, suspending, resuming, and stopping the task I of namespace IC and/or collapse the expanded view of task I. The expanded view of task I of namespace IC displays four recent occurrences of the task I having certain times of completion represented as timestamps in the GUI.

FIGS. 4A, 4B, 4C, and 5 illustrate examples hierarchical and navigable parts of one of many possible variations on a view of a GUI in accordance with embodiments of the present disclosure. Specifically, FIGS. 4A, 4B, 4C, and 5 illustrate different arrangements and states of navigable hierarchal view 400.

In FIG. 4A, navigable hierarchal view 400 is fully collapsed and only displaying three root namespaces, namespaces, I, II, and III. The name spaces are all displayed in one color, which can represent that tasks of the namespaces have not been ran yet, have all ran one or more times and have successfully been completed, or have all ran one or more times and failed to be completed. For the purposes of illustrating functionality of the GUI, in general, for FIG. 4A, the tasks of the namespaces have been executed one or more times and have been executed to completion. FIG. 4A also depicts a dropdown menu 440 with respective selectable parts for starting, suspending, resuming, and stopping the multiple tasks of namespace II. Also, shown in the menu 440, is a respective selectable part for expanding the namespace II to show at least its related sub-namespaces and/or tasks.

In FIG. 4B, navigable hierarchal view 400 is partially expanded to display all the sub-namespaces of namespace I, which are namespaces IA, IB, and IC. Also, the graphical element for namespace IA is partially expanded to display all the tasks linked to namespace IA, tasks I, II, III, IV, and V. Task I is depicted as expanded to show an instance that the task was ran with a certain time stamp showing when the instance of running the task failed. Task I is also depicted as expanded to show error handling and root cause analysis associated with the failing of completion of the task. The error handling and root cause analysis can provide detailed information in the navigable hierarchal view 400 or respective reference codes to error handling and root cause analysis in the view in some other embodiments.

In FIG. 4B, each of the graphical elements of the root namespaces is displayed in a different background color. The background color of namespace I indicates that a task of the namespace I has failed to be completed in an instance of running the task. The background color of namespace II indicates that all the tasks of the namespace II have not failed to be completed in recent or all instances of running the task. The background color of namespace III indicates that a task of the namespace III has not failed to be completed in all or recent instances of running the task, but it has been determined, by the enhanced GUI generator (or one or more other parts of one or more computing devices), that a task of the namespace is likely beyond a certain threshold to fail being completed in the near future or on the next execution of the task. Alternatively, the background color of the graphical element of namespace III indicates that a task of the namespace III has not failed to be completed in all or recent instances of running the task, but it has been determined, by the enhanced GUI generator (or one or more other parts of one or more computing devices), that an amount of errors occurred that exceeds a threshold in the completion of the task.

FIG. 4B also depicts a dropdown menu 450 with respective selectable parts for starting, suspending, resuming, and stopping the task V of sub-namespace IA. Also, shown in the menu 450, is a respective selectable part for expanding the task V to show at least its recent instances of being performed and possibly other information related to the task such as error handling and/or root cause analysis.

In FIG. 4C, navigable hierarchal view 400 is fully collapsed and only displaying the three root namespaces, namespaces, I, II, and III. As shown, each graphical element for the namespaces is provided with a different background color. The background color shown with namespace I illustrates that at least one task in the namespace has failed to be completely recently. The background color shown with namespace II illustrates that no task in the namespace has failed to be completely recently or ever. The background color shown with namespace III illustrates that no task in the namespace has failed to be completely recently or ever, but that at least one task is vulnerable to failing according to a certain threshold determination.

FIG. 5 depicts the navigable hierarchal view 400 as fully expanded for namespace I. Namespaces II and III are collapsed in FIG. 5. With the full expansion of namespace I, it is shown that namespace I has three sub-namespaces. The sub-namespace IA has five tasks, the sub-namespace IB has two tasks, and the sub-namespace IC has one task.

In navigable hierarchal view 400, the view is configured to display five most recent instances of execution of a task in an expanded view of the task when one of the five most recent instances of the task has failed to be completed. Task I of sub-namespace IA is shown as failed completion for the instance of running the task at timestamp 1, which is the most recent attempt at running the task. Timestamp 1 can show the exact time of failure of completion. In the instance of running task I at timestamp 2, the task completed but had enough errors to be marked as vulnerable to fail in the near future or the next execution of the task. In the instances of running the task I at timestamps 3, 4, and 5, the task completed but did not have enough errors to be marked as vulnerable—in other words, the instances are marked as a success according to the GUI.

In navigable hierarchal view 400, the view is configured to display four most recent instances of execution of a task in an expanded view of the task when one of the four most recent instances of the task has completed but has been marked as vulnerable to fail in the near future or the next execution of the task. Task V of sub-namespace IA is shown as completing, but with a marking for vulnerability of failure, for the instance of running the task at timestamp 1, which is the most recent attempt at running the task. Timestamp 1 can show the exact time of the vulnerable completion of task V. In the instances of running the task V at timestamps 2, 3, and 4, the task completed but did not have enough errors to be marked as vulnerable to fail in the near future or the next execution of the task--in other words, the instances are marked as a success according to the GUI.

Also, in navigable hierarchal view 400, the view is configured to display three most recent instances of execution of a task in an expanded view of the task when none of the three most recent instances of the task have failed to complete and have not been marked as vulnerable to fail in the near future or the next execution of the task. For example, in the instances of running the task II at timestamps 1, 2, and 3, the task completed and did not have enough errors to be marked as vulnerable—in other words, all the instances displayed are marked as a success according to the GUI.

FIG. 5 also depicts a dropdown menu 550 with respective selectable parts for starting, suspending, resuming, and stopping the task I of sub-namespace IC. Also, shown in the menu 550, is a respective selectable part for collapsing the task I so that only task I would be shown in the GUI without instances with timestamps 1, 2, 3, and 4.

Figure 6:
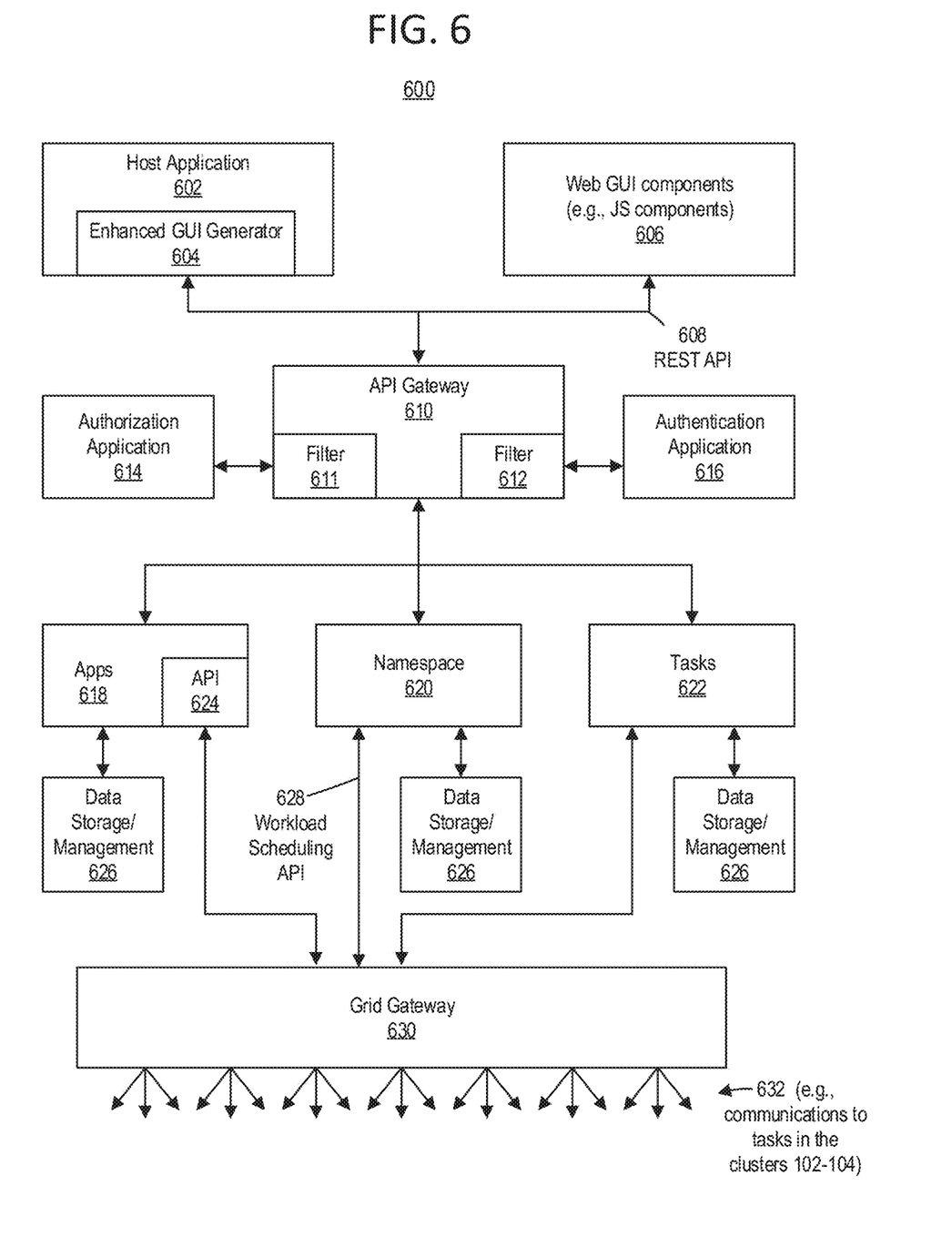
FIG. 6 is a schematic diagram illustrating an example of an architecture that can implement graphical management of big data pipelines and clusters, in accordance with some embodiments of the present disclosure.

FIG. 6 is a schematic diagram illustrating an example of an architecture 600 that can implement graphical management of big data pipelines and clusters, in accordance with some embodiments of the present disclosure. The architecture 600 includes host application 602 configured to support and/or execute enhanced GUI generator 604 (which can be or include enhanced GUI generator 244). The architecture also includes web GUI components 606, which can include JavaScript components. In some embodiments the web GUI components 606 can include JavaScript libraries for building user interfaces, such as REACT libraries. The architecture 600 also includes a representational state transfer application programming interface (REST API) 608 that uses components 606 as input for an API gateway 610 based on additional input provided by the enhanced GUI generator 604. The REST API 608 can be specifically configured for the enhanced GUI generator 604. In such an example, the GUI generator 604 can base its generated and/or rendered GUI on instructions from the Web GUI components 606.

The API gateway 610 includes filters that filter and direct API traffic in the architecture 600. The API gateway 610 can combine and direct, at least partially, the instructions and data from the enhanced GUI generator 604, and the REST API 608 can interface the web GUI components 606 with the API gateway 610.

The API gateway 610 also combines and directs access authorization processes for the GUI generator 604 through task access authorization filter 611 and task access authorization application 614. The filter 611 is one of the filters in the API gateway 610 and provides an interface to the access authorization application 614. The access authorization application 614 can authorize access to namespace metadata and access to grid tasks in big data clusters. The access authorization application 614 can be used to manage access to big data jobs through the GUI generated by the GUI generator 604 as well as the starting, killing, suspending, and restarting of jobs in the clusters through the GUI generated by the GUI generator 604. In some embodiments, access authorization application 614 can provide role-based authorization (RBAC) for provisioning and configuration of tasks in the clusters (such as for centralized authorization), as well as can provide support for serving runtime jobs that are decentralized.

The API gateway 610 also combines and directs user authentication processes for the GUI generator 604 through user authentication filter 612 and user authentication application 616. The filter 612 is one of the filters in the API gateway 610 and provides an interface to the authentication application 616. The authentication application 616 can provide identity management and use adaptive multi-factor user authentication for use of the GUI generated by the GUI generator 604.

Using host application 602, enhanced GUI generator 604, web GUI components 606, REST API 608, task access authorization filter 611 and application 614, and user authentication filter 612 and application 616, or any combination thereof, API gateway 610 can control and direct generation of an interactive GUI for graphically managing applications 618 utilizing big data, namespaces 620 (such as namespaces related to and organized by the applications 618), and the big data tasks 622 under the namespaces. The applications 618 can be used to organize the namespaces 620 into groups and parameterize the namespaces and corresponding tasks. API 624 can provide an application programming interface for generating the applications 618 and parameterizing the namespaces and corresponding tasks. Also, the API 624 can provide configuration of runtime parameters for the applications 618.

Data and information (e.g., metadata for applications, namespaces, and tasks) utilized by the aforesaid components of architecture 600 to derive the interactive GUI for graphically managing applications 618, related namespaces 620, and the corresponding tasks 622 is stored and accessed through data storage and management system 626. The data storage and management system 626 can use a database management system and/or a cloud storage platform (such as SHERPA). The database management system and/or a cloud storage platform can be SQL based systems or NoSQL systems. The API gateway 610 can provide an interface for the APIs of the architecture 600 which can interact with the data storage and management system 626 through a database management system and/or a cloud storage platform.

Big data task scheduling components of or associated with the architecture 600 can be utilized through workload scheduling API 628 (e.g., OOZIE API). The interactive GUI generated by the generator 604 for graphically managing applications 618, related namespaces 620, and the tasks 622 can interact with the workload scheduling API 628 via namespaces 620 and the API gateway 610 to provide information to control grid gateway 630. The interactive GUI generated by the generator 604 for graphically managing applications 618, related namespaces 620, and the tasks 622 can also interact with the API gateway 610, the applications 618, and the tasks 622 to provide information to control grid gateway 630. Grid gateway 630 can include filters and other processes to control execution of the tasks 622 in big data management and processing clusters, via communications 632 (such as execution of the tasks in the clusters 102-104 depicted in FIG. 1). The tasks 622 can be associated with the applications 618 and the namespaces 620, or only with namespaces—depending on the embodiment. As, shown in FIG. 6, the API 624 interfaces the applications 618 with the grid gateway 630. API 624 can provide an API for generating the applications 618 and parameterizing the namespaces and corresponding tasks. Also, the API 624 can provide configuration of runtime parameters for the applications 618 that are communicated and directed through the grid gateway 630.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module can be stored on a computer readable medium for execution by a processor. Modules can be integral to one or more servers, or be loaded and executed by one or more servers. One or more modules can be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure can be implemented in many manners and as such are not to be limited by the foregoing exemplary embodiments and examples. In other words, functional elements being performed by single or multiple components, in various combinations of hardware and software or firmware, and individual functions, can be distributed among software applications at either the client level or server level or both. In this regard, any number of the features of the different embodiments described herein can be combined into single or multiple embodiments, and alternate embodiments having fewer than, or more than, all of the features described herein are possible.

Functionality can also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that can be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications can be made to the elements and operations described above to obtain a result that remains within the scope of the systems and processes described in this disclosure.

What is claimed is:

1. A method comprising:

generating, in a database, a first configurable namespace to be used by a work scheduling enhancement application, executed by at least one processor, to group together a first plurality of data processing tasks of a big data processing;

generating, in the database, a second configurable namespace to be used by the application to group together a second plurality of data processing tasks of the big data processing, the second configurable namespace being generated as a child namespace of the first configurable namespace such that the first configurable namespace is a parent namespace of the second configurable namespace;

generating, in the database, a third configurable namespace to be used by the application to group together a third plurality of data processing tasks of the big data processing, the third configurable namespace being generated as a child namespace of the first configurable namespace such that the first configurable namespace is a parent namespace of the third configurable namespace and the second configurable namespace is a sibling namespace of the third configurable namespace;

linking in the database, by the application, the second plurality of tasks with the second configurable namespace to group together the second plurality of tasks under the second configurable namespace;

linking in the database, by the application, the third plurality of tasks with the third configurable namespace to group together the third plurality of tasks under the third configurable namespace;

configuring, by the application, a display scheme for displaying error handling and root cause analysis of tasks of the big data processing, wherein the configuring of the display scheme comprises configuring a color scheme for displaying error handling and root cause analysis of tasks;

generating, by the application and using stored information from the database, a graphical user interface (GUI) comprising a navigable hierarchal view displaying the first configurable namespace as a parent namespace of the second and third configurable namespaces, the generation of the GUI based partially on the display scheme, the GUI comprising a plurality of components for graphically monitoring and managing execution of the big data processing tasks;

responsive to a change in execution state of big-data processing of at least one task of the big data processing, updating the GUI to indicate the change in execution state;

displaying a task linked to one of the configurable namespaces with a background of a first selected color and with error handling and root cause analysis of the task, based on the color scheme, when the task fails to be completed; and displaying the task with a background of a second selected color and without error handling and root cause analysis, based on the color scheme, when the task is completed.

2. The method of claim 1, further comprising linking in the database, by the application, the first plurality of tasks with the first configurable namespace to group together the first plurality of tasks under the first configurable namespace.

3. The method of claim 2, wherein the display scheme comprises respective first, second, and third sub-display schemes for the first, second, and third configurable namespaces, and wherein the method further comprises configuring, by the application, each of the sub-display schemes for displaying error handling and root cause analysis of tasks separately and differently.

4. The method of claim 1, further comprising displaying a task linked to one of the configurable namespaces with error handling and root cause analysis of the task, when the task fails to be completed.

5. The method of claim 4, further comprising:
selectively collapsing the display of error handling and root cause analysis such that the navigable hierarchal view is only displaying the task failing to be completed without the display of error handling and root cause analysis; and
selectively expanding the collapsed display to display the error handling and root cause analysis.

6. The method of claim 1, further comprising the GUI displaying, in the navigable hierarchal view, selectable parts for performing a function selected from a group consisting of starting, suspending, resuming, and stopping tasks of the namespaces, or any combination thereof.

7. The method of claim 1, wherein the scope of the first configurable namespace corresponds to the scope of big data management and processing of an entire grouping of computing devices, and wherein the first configurable namespace has at least one sibling configurable namespace having a scope corresponding to the scope of big data management and processing of another entire grouping of computing devices.

8. A non-transitory computer-readable storage medium tangibly encoded with computer-executable instructions, that when executed by a processor of computing device, performs a method, the method comprising:
generating, in a database, a first configurable namespace to use to group together a first plurality of data processing tasks of a big data processing;
generating, in the database, a second configurable namespace to use to group together a second plurality of data processing tasks of the big data processing, the second configurable namespace being generated as a child namespace of the first configurable namespace such that the first configurable namespace is a parent namespace of the second configurable namespace;
generating, in the database, a third configurable namespace to use to group together a third plurality of data processing tasks of the big data processing, the third configurable namespace being generated as a child namespace of the first configurable namespace such that the first configurable namespace is a parent namespace of the third configurable namespace and the second configurable namespace is a sibling namespace of the third configurable namespace;
configuring a display scheme for displaying error handling and root cause analysis of tasks of the big data processing, wherein the configuring of the display scheme comprises configuring a color scheme for displaying error handling and root cause analysis of tasks;
generating, using stored information from the database, a graphical user interface (GUI) comprising a navigable hierarchal view displaying the first configurable namespace as a parent namespace of the second and third configurable namespaces, the generation of the GUI based partially on the display scheme, the GUI comprising a plurality of components for graphically monitoring and managing execution of the big data processing tasks at various hierarchical levels;
displaying, with one of the configurable namespaces displayed in the navigable hierarchal view, error handling and root cause analysis of a task linked to the one of the configurable namespaces, when the task fails to be completed;
responsive to a change in execution state of big-data processing of at least one task of the big data processing, updating the GUI to indicate the change in execution state;
displaying a task linked to one of the configurable namespaces with a background of a first selected color and with error handling and root cause analysis of the task, when the task fails to be completed; and
displaying the task with a background of a second selected color and without error handling and root cause analysis, when the task is completed.

9. The non-transitory computer-readable storage medium of claim 8, wherein the method further comprises:
linking, in the database, the first plurality of tasks with the first configurable namespace to group together the first plurality of tasks under the first configurable namespace;
linking, in the database, the second plurality of tasks with the second configurable namespace to group together the second plurality of tasks under the second configurable namespace; and
linking, in the database, the third plurality of tasks with the third configurable namespace to group together the third plurality of tasks under the third configurable namespace.

10. The non-transitory computer-readable storage medium of claim 8, wherein the method further comprises:
selectively collapsing the display of error handling and root cause analysis such that the navigable hierarchal view is only displaying the task failing to be completed without the display of error handling and root cause analysis; and
selectively expanding the collapsed display to display the error handling and root cause analysis.

11. The non-transitory computer-readable storage medium of claim 8, wherein the method further comprises the GUI displaying, in the navigable hierarchal view, selectable parts for starting, suspending, resuming, and stopping tasks of the namespaces.

12. The non-transitory computer-readable storage medium of claim 8, wherein the scope of the first configurable namespace corresponds to the scope of big data management and processing of an entire grouping of computing devices, and wherein the first configurable namespace has at least one sibling configurable namespace having a scope corresponding to the scope of big data management and processing of another entire grouping of computing devices.

13. A system, comprising:
a computing device, comprising a processor and a non-transitory computer-readable storage medium for tangibly storing thereon program logic for execution by the processor, the program logic comprising:
executable logic for generating, in a database, a first configurable namespace to use to group together a first plurality of data processing tasks of a big data processing;
executable logic for generating, in the database, a second configurable namespace to use to group together a second plurality of data processing tasks of the big data processing, the second configurable namespace being generated as a child namespace of the first configurable namespace such that the first configurable namespace is a parent namespace of the second configurable namespace;

executable logic for generating, in the database, a third configurable namespace to use to group together a third plurality of data processing tasks of the big data processing, the third configurable namespace being generated as a child namespace of the first configurable namespace such that the first configurable namespace is a parent namespace of the third configurable namespace and the second configurable namespace is a sibling namespace of the third configurable namespace;

executable logic for configuring a display scheme for displaying error handling and root cause analysis of tasks of the big data processing, wherein the executable logic for configuring of the display scheme comprises executable logic for configuring a color scheme for displaying error handling and root cause analysis of tasks;

executable logic for generating, by the application and using stored information from the database, a graphical user interface (GUI) comprising a navigable hierarchal view displaying the first configurable namespace as a parent namespace of the second and third configurable namespaces, the generation of the GUI based partially on the display scheme, the GUI comprising a plurality of components for graphically monitoring and managing execution of the big data processing tasks at various hierarchical levels;

responsive to a change in execution state of big-data processing of at least one task of the big data processing, executable logic for updating the GUI to indicate the change in execution states executable logic for displaying a task linked to one of the configurable namespaces with a background of a first selected color and with error handling and root cause analysis of the task, when the task fails to be completed; and executable logic for displaying the task with a background of a second selected color and without error handling and root cause analysis, when the task is completed.

14. The system of claim 13, wherein the program logic further comprises:

displaying, with one of the configurable namespaces displayed in the navigable hierarchal view, error handling and root cause analysis of a task linked to the one of the configurable namespaces when the task fails to be completed;

selectively collapsing the display of error handling and root cause analysis such that the navigable hierarchal view is only displaying the task failing to be completed without the display of error handling and root cause analysis; and selectively expanding the collapsed display to display the error handling and root cause analysis.

* * * * *